United States Patent Office 2,808,412
Patented Oct. 1, 1957

2,808,412
SUBSTITUTED OXAZOLINE-2-THIONES AND PROCESS

Roy Arthur Jeffreys, Harrow, England, assignor to Eastman Kodak Company, Rochester, N. Y., a corporation of New Jersey No Drawing. Application November 10, 1954, Serial No. 468,135

9 Claims. (Cl. 260—307)

This invention relates to new intermediates, useful in the preparation of optical sensitizing dyes, and a method for making them.

The new intermediates of my invention can advantageously be represented by the following general formula:

I
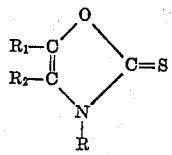

wherein R represents an alkyl group, such as methyl, ethyl, n-propyl, isopropyl, n-butyl, n-octyl, n-dodecyl, benzyl (phenylmethyl), etc. (e. g., an alkyl group of the formula $C_nH_{2n+1}$ wherein $n$ represents a positive integer of from 1 to 12) or an aryl group, such as phenyl, o-, m-, and p-tolyl, etc. (e. g., a mononuclear aromatic group of the benzene series containing from 6 to 7 carbon atoms), and $R_1$ and $R_2$ each represents an aryl group, such as phenyl, o-, m-, and p-tolyl, p-chlorophenyl, p-methoxyphenyl, etc. (e. g., a mononuclear aromatic group of the benzene series containing from 6 to 7 carbon atoms).

It is, therefore, an object of my invention to provide new intermediates for preparing optical sensitizing dyes and a method for making such intermediates. Another object is to provide new optical sensitizing dyes and a method for making them. Still another object is to provide photographic silver halide emulsions containing these new dyes. Other objects will become apparent from a consideration of the following description and examples.

According to my invention, I provide intermediates selected from those represented by Formula I above by condensing a compound selected from those represented by the following general formula:

II
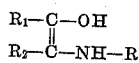

wherein R, $R_1$ and $R_2$ each have the values given above, together with thiophosgene, represented by the formula:

The condensations proceed at room temperature, although temperatures of from −20° C. to about 40° C. can advantageously be employed. Inert solvents can be employed, if desired, such as chloroform, diethyl ether, 1,4-dioxane, benzene, etc. While alcohols can be employed as solvents, the yields of desired products are lowered. The compounds represented by Formula II above may be employed in the form of their acid addition salts, e. g., hydrochlorides, hydrobromides, etc., which are treated with alkaline solutions before use to liberate the bases represented by Formula II. These acid addition salts of the compounds represented by Formula II can be prepared as described by Lutz et al.—"J. A. C. S.," vol. 70, page 2016, and vol. 71, page 479.

The compounds represented by Formula I above can be quaternated by heating together with an alkyl salt represented by the following general formula:

III
$R_3—X$ wherein $R_3$ represents an alkyl group, such as methyl, ethyl, n-propyl, n-butyl, etc. (e. g., an alkyl group of the formula $C_mH_{2m+1}$ wherein $m$ represents a positive integer of from 1 to 4), and X represents an acid radical, such as chloride, bromide, iodide, benzenenesulphonate, p-toluenesulphonate, methylsulphate, ethylsulphate, etc. to give compounds represented by the following general formula:

IV
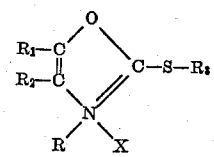

wherein R, $R_1$, $R_2$, $R_3$ and X each have the values given above.

The compounds selected from those represented by Formula IV above can be condensed with a compound selected from those represented by the following two general formulas:

V
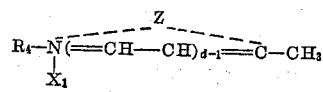

and

VI
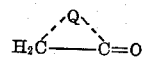

wherein $R_4$ represents an alkyl group, such as methyl, ethyl, n-propyl, n-butyl, β-hydroxyethyl, etc., $X_1$ represents an acid radical, such as those listed above for X, $d$ represents a positive integer of from 1 to 2, Z represents the non-metallic atoms necessary to complete a heterocyclic nucleus containing from 5 ($n$ is 1) to 6 ($n$ is 2) atoms in the heterocyclic ring, such as those of the thiazole series (e. g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6 - iodobenzothiazole, 4 - ethoxybenzothiazole, 5 - ethoxybenzothiazole, tetrahydrobenzothiazole, 5,6 - dimethoxybenzothiazole, 5,6 - dioxymethylenebenzothiazole, 5-hydroxybenzothiazole, 6-hydroxybenzothiazole, etc.), those of the naphthothiazole series (e. g., α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7',6',4,5-thiazole series (e. g., 4'-methoxy-thianaphtheno-7',6',4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.) those of the benzoxazole series (e. g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6 - methoxybenzoxazole, 5 - hydroxybenzoxazole, 6-hydroxybenzoxazole, etc.), those of the naphthoxazole series (e. g., α-naphthoxazole, β-naphthoxazole, etc.), those of the selenazole series (e. g., 4-methylselenazole, 4-phenylselenazole, etc.), those of the benzoselenazole series (e. g., benzoselenazole 5-chlorobenzoselenazole, 5-methoxybenzoselenazole, 5-hydroxybenzoselenazole, tetrahydrobenzoselenazole, etc.), those of the naphthoselenazole series ( e. g., α-naphthoselenazole, β-naphthoselenazole, etc.), those of the thiazoline series (e. g., thiazoline, 4-methylthiazoline, etc.), those of the 2- quinoline series (e. g., quinoline, 6-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g., quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g., isoquinoline, etc.), those of the 3,3-dialkylindolenine series (e. g., 3,3-dimethylindolenine, 3,3,5-trimethylindolenine, 3,3,7-trimethylindolenine etc.), the pyridine series (e. g., pyridine, 5-methylpyridine, etc.), etc., and Q represents the non-metallic atoms necessary to complete a heterocyclic nucleus containing from 5 to 6 atoms in the heterocyclic ring, such as those of the rhodanine series (i. e., 2-thio-2,4-thiazolidinedione series), such as rhodanine, 3-alkylrhodanines (e. g., 3-ethylrhodanine, 3-allylrhodanine, etc) or 3-arylrhodanines (e. g., 3-phenylrhodanine, etc.), etc., those of the 2-thio-2,4-oxazolidinedione series (i. e., those of the 2-thio-2,4-(3H, 5H)-oxazoledione series) (e. g., 3-ethyl-2-thio-2,4-oxazolidinedione, etc.), those of the 2-thio-2,4-imidazolinedione (i. e., 2- thiohydantoin) series (e. g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl-3-α-naphthyl-2-thio-2,4-imidazolinedione, 1,3-diphenyl-2-thio-2,4-imidazolinedione, etc), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom). The resulting condensations yield, respectively, simple cyanine dyes represented by the following general formula:

Va

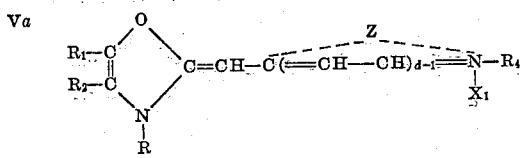

wherein R, R₁, R₂, R₄, X, d, and Z each have the values given above, and simple merocyanine dyes represented by the following general formula:

VIa

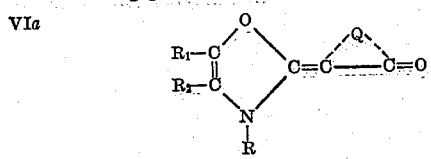

wherein R, R₁, R₂, and Q each have the values given above. The condensations can advantageously be carried out in the presence of an inert diluent, such as the lower aliphatic alcohols, e. g., methanol, ethanol, n-propanol, n-butanol, etc., 1,4-dioxane pyridine etc. The condensations can be carried out in the presence of a basic condensing agent, such as the trialkylamines (e. g., triethylamine tripropylamine, triisopropylamine, tributylamine, etc.), the N,N-dialkylanilines (e. g., N,N-dimethylaniline, N,N-diethylaniline, etc.), the N-alkylpiperidines (e. g. N-methylpiperidine, N-ethylpiperidine, etc.), etc. Heat accelerates the condensations, although temperatures varying from room temperature (ca. 25° C.) to the reflux temperature of the reaction mixture can advantageously be employed.

The following examples will serve to illustrate more fully the method of practicing my invention.

*Example 1.—3-n-butyl-4,5-diphenyl-2-thio-oxazoline*

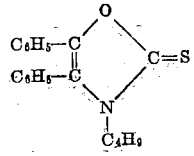

n-Butyldesylamine hydrochloride (10.0 g.) and potassium hydroxide (5.6 g.) were dissolved in ethanol (20 cc.) and water (4 cc.). To the solution was added thiophosgene (3.8 g.). After standing a half hour at room temperature, a gum was precipitated by addition of water to the reaction solution. This was extracted with ether, the solution dried with sodium sulphate, and the ether removed. The residue was recrystallized from ligroin as colorless needles, M. P. 145° C., in 2 g. yield. (Found: N, 4.3; S, 10.2. C₁₉H₁₉ONS requires N, 4.5; S, 10.4%.)

*Example 2.—3-n-butyl-2-methylthio-4,5-diphenyloxazolium methylsulphate*

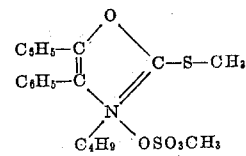

3-n-butyl-4,5-diphenyl-2-thio-oxazoline (3.09 g.) and methylsulphate (1.52 g.) were heated for 20 minutes on the steam bath. It was used without further purification.

*Example 3.—5-(3-n-butyl-4,5-diphenyloxazolin-2-ylidene)-3-ethoxycarbonylmethyl-2-thiothiazolid-4-one*

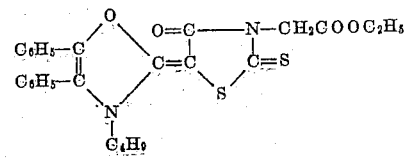

The product from Example 2, with 3-ethoxycarbonylmethylrhodanine (2.19 g.) and triethylamine (1.4 cc.) in ethanol (25 cc.) were refluxed for 10 minutes on the steam bath, chilled, and the dye filtered off. This was recrystallized from benzene-light petroleum as yellow needles, M. P. 139° C. (Found: N, 5.5; S, 13.0. C₂₆H₂₆O₄N₂S₂ requires N, 5.7; 13.0%.) It sensitized a silver chloride emulsion to 490 mu with a peak at 450 mu, and a silver chlorobromide emulsion to 510 mu with a peak at 480 mu.

*Example 4.—3-ethyl-4,5-diphenyl-2-thio-oxazoline*

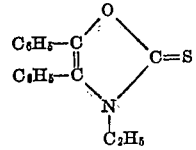

Sufficient sodium carbonate solution was added to a solution of N-ethyldesylamino hydrochloride (11.0 g.) in water (50 cc.) to liberate the free amine. The base was extracted with chloroform and dried over sodium sulphate. Thiophosgene (4.6 g.) was dropped into this solution, cooled in ice-water. After standing the solution for ½ hour at room temperature, sodium carbonate solution was added, and the mixture was shaken and separated. The chloroform solution was washed with water, dried, and the chloroform removed. The residue solidified and was recrystallized from methanol as prisms (6.0 g., 53%), M. P. 163° C. (Found: N, 5.0; S, 11.3. C₁₇H₁₅ONS requires N, 5.0; S, 11.4%.)

Example 5.—3-ethyl-2-methylthio-4,5-diphenyloxazolium methylsulphate

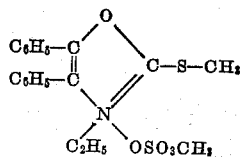

3-ethyl-4,5-diphenyl-2-thio-oxazoline (2.81 g.) and methylsulphate (1.52 g.) were heated for 1 hour on the steam bath. The product was used without further purification.

Example 6.—(3-ethyl-4-p-methoxyphenyl-5-phenyl-2-oxazole)(3 - ethyl-4,5-diphenyl-2-oxazole)methinecyanine perchlorate

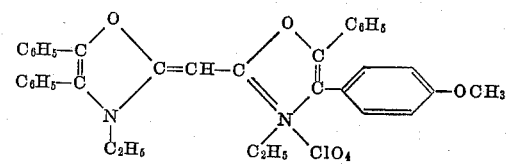

4-p-methoxyphenyl-2-methyl-5-phenyloxazole (2.65 g.) and ethyltoluene-p-sulphonate (2.1 g.) were heated together for 2 hours at 140° C. To the product were added 3-ethyl-2-methylthio - 4,5 - diphenyloxazolium methylsulphate (4.07 g.) and triethylamine (1.4 cc.) in ethanol (20 cc.). The solution was refluxed for a quarter hour, and then aqueous sodium perchlorate was added. The dye was filtered off and recrystallized from pyridine-water as cream leaflets, M. P. 277° C., in 22% yield. (Found: N, 4.3; Cl, 5.6. $C_{36}H_{33}O_7N_2Cl$ requires N, 4.4; Cl, 5.5%.)

Example 7.—3-ethyl-5-(3 - ethyl-4,5-diphenyloxazolin-2-ylidene)-2-thio-oxazolid-4-one

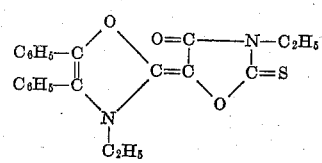

The product from Example 5 and 3-ethyl-2-thio-oxazolid-4-one (1.45 g.) with triethylamine (1.4 cc.) in ethanol (25 cc.) were refluxed for 15 minutes. A little water was added and the solution was chilled and filtered. The dye was recrystallized from benzene-light petroleum as cream needles, M. P. 177° C. (31%). (Found: N, 7.0; S, 8.1. $C_{22}H_{20}O_3N_2S$ requires N, 7.1; S, 8.2%.) It sensitized a silver chloride emulsion to 440 mu with a peak at 400 mu.

Example 8.—3 - ethyl-5-(3-ethyl-4,5-diphenyloxazolin-2-ylidene)-2-thiothiazolid-4-one

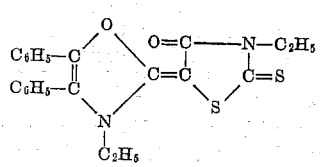

The product from Example 5 and 3-ethylrhodanine (1.6 g.) and triethylamine (1.4 cc.) in ethanol (25 cc.) were refluxed for 15 minutes. A little water was added, and the solution was chilled and filtered. The dye was recrystallized from benzene-light petroleum as a yellow powder, M. P. 179° C. (64%). (Found: N, 6.7; S, 15.8. $C_{22}H_{20}O_2N_2S_2$ requires N, 6.9; S, 15.7%.) It sensitized a silver chloride emulsion to 495 mu with a peak at 450 mu and a silver chlorobromide emulsion to 500 mu with a peak at 485 mu.

Example 9.—1,3-diethyl-5-(3-ethyl-4,5-diphenyloxazolin-2-ylidene)-2-thiohydantoin

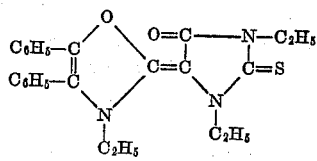

The product from Example 5, and 1,3-diethyl-2-thiohydantoin (1.72 g.) with triethylamine (1.4 cc.) and ethanol (25 cc.) were refluxed for 10 minutes. A little water was added, and the solution was chilled and filtered. The dye was recrystallized from benzene-light petroleum and then from ligroin as lemon needles, M. P. 182° C. (14%). (Found: N, 9.9; S, 7.7. $C_{24}H_{25}O_2N_3S$ requires N, 10.0; S, 7.6%.) It sensitized a silver chloride emulsion to 445 mu with a peak at 420 mu.

Example 10.—Bis(3 - ethyl - 4,5 - diphenyl - 2 - oxazole) methinecyanine perchlorate

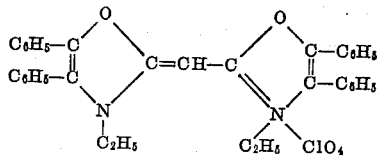

2-methyl - 4,5 - diphenyloxazole (2.35 g.) and ethyltoluene-p-sulphonate (2.1 g.) were heated for 2 hours at 140° C. To this was added the product from Example 5, triethylamine (1.4 cc.) and ethanol (25 cc.) and the solution was refluxed for 15 minutes. The solution was cooled and aqueous sodium perchlorate added. The dye was filtered off and recrystallized from pyridine-methanol-ether as primrose leaflets, M. P. 281° C. (decomp.) in 15% yield. (Found: N, 4.5; Cl, 5.9. $C_{35}H_{31}O_6N_2Cl$ requires N, 4.6; Cl, 5.8%.)

Example 11.—3-carboxymethyl-5-(3 - ethyl-4,5-diphenyl-oxazolin-2-ylidene)-2-thiothiazolid-4-one

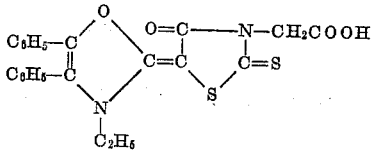

The product from Example 5, 3-carboxymethyl-rhodanine (1.91 g.), triethylamine (2.8 cc.) and ethanol (20 cc.) were refluxed for 15 minutes and the solution was chilled and acidified with concentrated hydrochloric acid. The dye was filtered off and recrystallized from benzene-light petroleum as yellow needles, M. P. 257° C. (30%). (Found: N, 6.7; S, 14.9. $C_{22}H_{18}O_4N_2S_2$ requires N, 6.4; S, 14.6%.) It sensitized a silver chloride emulsion to 510 mu with a peak at 480 mu and a silver chlorobromide emulsion to 500 mu with a peak at 460 mu.

Example 12.—3,4,5-triphenyl-2-thio-oxazoline

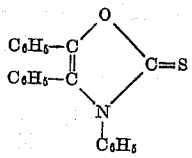

Desylaniline (28.7 g.) in chloroform (125 cc.) was cooled in ice-water. Thiophosgene (12 g.) was added slowly to the stirred solution, the temperature being kept below 15° C. A white solid slowly formed. The solution, after 30 minutes at room temperature, was shaken with excess sodium carbonate solution, and more chloroform was added to dissolve all the product. The chloroform solution was separated and washed with water until the washings were neutral to litmus. It was then separated, dried over sodium sulphate, and concentrated. The product was recrystallized from benzene-light petroleum as prisms (15.9 g., 48.4%), M. P. 216° C. (Found: N, 4.3; S, 9.8. $C_{21}H_{15}ONS$ requires N, 4.3; S, 9.8%.)

*Example 13.—2-methylthio - 3,4,5 - triphenyloxazolium methylsulphate*

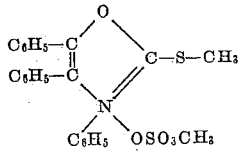

3,4,5-triphenyl-2-thio-oxazoline (1.65 g.) and methylsulphate (0.95 g.) were heated together on the steam-bath for ½ hour. The mass solidified and was used without purification.

*Example 14.—3-ethoxycarbonylmethyl-5-(3,4,5-triphenyl-oxazolin-2-ylidene)-2-thiothiazolid-4-one*

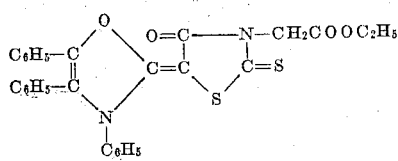

The product from Example 13 and 3-ethoxycarbonylmethylrhodanine (1.1 g.) with triethylamine (0.7 cc.) in ethanol (20 cc.) were refluxed together for 10 minutes. After chilling and filtering the solution, the dye (1.9 g.) was obtained and recrystallized from pyridine-methanol as yellow leaflets, M. P. 331° C. (Found: N, 5.5; S, 12.6. $C_{28}H_{22}O_4N_2S_2$ requires N, 5.5; S, 12.5%.)

*Example 15.—3-ethyl-4-p-methoxyphenyl-5-phenyl-2-thio-oxazoline*

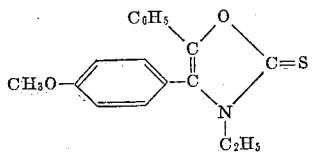

and

*3-ethyl-5-p-methoxyphenyl-4-phenyl-2-thio-oxazoline*

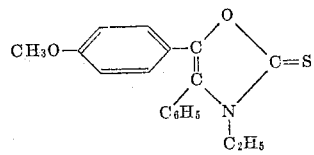

p-Methoxybenzoin (72.6 g.), ethylamine hydrochloride (3 g.) and 70% aqueous ethylamine (90 cc.) were refluxed together. After 2 hours a further 15 cc. of aqueous ethylamine was added. After 4 hours the substituted desylamine mixture was made basic with sodium carbonate, extracted with ether, and dried.

This product (62 g.) was dissolved in chloroform (400 cc.) and cooled in ice-water. Thiophosgene (20.3 cc.) was slowly added to the stirred solution. The solution was allowed to stand for ½ hour at room temperature, shaken with excess aqueous sodium carbonate, washed with water, separated, and dried over sodium sulphate. On removing the chloroform a solid mixture of 3-ethyl-4-p-methoxyphenyl-5-phenyl-2-thio-oxazoline and 3-ethyl-5-p-methoxyphenyl-4-phenyl-2-thio-oxazoline (20 g.) was obtained. A chromatographic separation of these on alumina with ligroin and benzene mixtures as eluents provided first the 3-ethyl-5-p-methoxyphenyl-4-phenyl-2-thio-oxazoline as cubes (from benzene-light petroleum), M. P. 145° C. (Found: N, 4.5; S, 10.5. $C_{18}H_{17}O_2NS$ requires N, 4.5; S, 10.3%), and then 3-ethyl-4-p-methoxyphenyl-5-phenyl-2-thio-oxazoline as needles (from benzene-light petroleum), M. P. 180° C. (Found: N, 4.5; S, 10.5. $C_{18}H_{17}O_2NS$ requires N, 4.5; S, 10.3%.)

The new dyes of my invention, as shown above, are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of my new dyes. The dyes are advantageously incorporated in the finished, washed emulsions and should be uniformly distributed throughout the emulsions.

The concentration of the dyes in the emulsions can vary widely, e. g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver halide emulsion sensitized with one or more of my new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver halide emulsion, with stirring. Stirring is continued until the dye is uniformly dispersed in the emulsion.

With most of my dyes, from 10 to 20 mg. of dye per liter of gelatino-silver bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g., by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e. g., sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc., or mixtures of such sensitizers), antifoggants (e. g., benzotriazole, nitrobenzimidazole, 5-nitroindazole, etc. (see Mees— "The Theory of the Photographic Process," MacMillan Pub. (1942), p. 460), or mixtures thereof), hardeners (e. g., formaldehyde (U. S. 1,763,533), chrome alum (U. S. 1,763,533), glyoxal (Germany 538,713), dibromacrolein (Great Britain 406,750), etc.), color couplers (e. g., such as those described in U. S. Patent 2,423,730, Spence and Carroll U. S. application 771,380, filed August 29, 1947, now U. S. Patent 2,640,776, etc.), or mixtures of such addenda. Dispersing agents for color couplers, such as substantially water-insoluble, high boiling crystalloidal materials, such as those set forth in U. S.

Patents 2,322,027 and 2,304,940, can also be employed in the above-described emulsions.

What I claim as my invention and desire secured by Letters Patent of the United States is:

1. A compound selected from those represented by the following general formula:

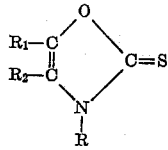

wherein R represents a member selected from the group consisting of an alkyl group of the formula $C_nH_{2n+1}$ wherein $n$ represents a positive integer of from 1 to 12 and a monocyclic aryl hydrocarbon group of the benzene series containing from 6 to 7 carbon atoms and $R_1$ and $R_2$ each represents a mononuclear aromatic group of the benzene series containing from 6 to 7 carbon atoms selected from the group consisting of phenyl, tolyl, chlorophenyl and methoxyphenol.

2. The compound represented by the following formula:

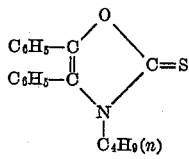

3. The compound represented by the following formula:

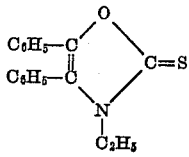

4. The compound represented by the following formula:

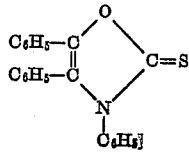

5. The compound represented by the following formula:

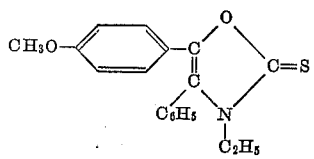

6. The compound represented by the following formula:

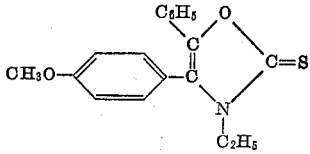

7. A process for preparing 2-thio-oxazolines comprising intermixing a compound selected from those represented by the following general formula:

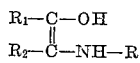

wherein R represents an alkyl group of the formula $C_nH_{2n+1}$ wherein $n$ represents a positive integer of from 1 to 12, $R_1$ represents a monocyclic aryl hydrocarbon group of the benzene series containing from 6 to 7 carbon atoms, and $R_2$ represents a mononuclear aromatic group of the benzene series containing from 6 to 7 carbon atoms selected from the group consisting of phenyl, tolyl, chlorophenyl and methoxyphenyl, together with thiophosgene, and separating the resulting 2-thio-oxazoline from the reaction mixture.

8. A process for preparing 3-n-butyl-4,5-diphenyl-2-thio-oxazoline comprising intermixing n-butyldesylamine together with thiophosgene.

9. A process for preparing 3-ethyl-4,5-diphenyl-2-thio-oxazoline comprising intermixing N-ethyldesylamine together with thiophosgene.

References Cited in the file of this patent

UNITED STATES PATENTS

| | | |
|---|---|---|
| 2,089,322 | Zeh | Aug. 10, 1937 |
| 2,089,323 | Zeh | Aug. 10, 1937 |
| 2,112,445 | Niederl | Mar. 29, 1938 |
| 2,115,681 | Koffer | Apr. 26, 1938 |
| 2,245,361 | Pinkney | June 10, 1941 |
| 2,325,552 | Schlack | July 27, 1944 |
| 2,362,337 | Anderson | Nov. 7, 1944 |